Patented Mar. 2, 1937

2,072,737

UNITED STATES PATENT OFFICE 2,072,737

PROCESS OF COOLING BREAD AND BAKERY PRODUCTS

Montague H. Duval, Great Neck, N. Y.

No Drawing. Application June 17, 1935,
Serial No. 27,127

8 Claims. (Cl. 107—54)

My invention relates to the cooling of bread and similar bakery products and particularly to a process including vacuum cooling.

Vacuum cooling has heretofore been suggested for cooling bread, but has never attained any practical importance because of difficulties which have rendered the loaf incapable of being properly sliced in a commercial slicing machine. One particular objection has been that the loaf cooled in this manner has a hard, dried-out crust, and of equal importance, the vacuum cooled loaf was not acceptable because of the excessive moisture loss required to bring the loaf to a satisfactory final temperature.

With respect to the condition of the crust, the bread as removed from the oven has a crust and crust zone which are relatively hard and contain a minimum of moisture. The immediate presentation of the loaf to the vacuum cooling apparatus therefore aggravates this condition in that the loaf as removed from the oven is substantially uniform in temperature throughout and the vacuum treatment removes moisture both from the crust and crust zone as well as from the crumb. Since the crust and crust zone contain a minimum of moisture before vacuum treatment, a removal of any part of this moisture results in the production of a loaf having an extremely hard crust unsuitable for slicing.

Also, when the loaf is transferred immediately from the oven to the vacuum apparatus, since it is of high temperature throughout, and is subjected to a suitable vacuum to reduce its temperature to the desired final point, a great deal of moisture will be evaporated due to the original high temperature of the loaf and the wide differential or drop between this original temperature and the vaporization point of water under the vacuum to which the loaf must be submitted to properly cool it.

As a result, the loaf as delivered from the vacuum chamber is unsuitable for slicing because the crust and the crust zone lack the softness and moisture for a clean severance by a slicing machine. Moreover, the cooling step has necessitated the removal of moisture to the extent that the bread is not an acceptable product.

I have discovered that both of these objectionable results may be overcome and vacuum cooling as a rapid and efficient means for the treatment of bread employed with facility.

With my invention the bread after removal from the oven is subjected to a tempering or holding period for two purposes, namely (1) to permit the distribution of moisture from the crumb to the crust and crust zone whereby these are rendered soft and their moisture content increased, and (2) the loaf is allowed to lose heat by radiation, which loss by radiation occurs at the surface or crust of the loaf, resulting in a crust temperature substantially below that of the crumb.

Following the holding or tempering period, the crust and crust zone being soft and moist and at a temperature appreciably below that of the temperature of the crumb, the loaf is subjected to a vacuum treatment wherein the pressure is controlled to promote the rapid cooling of the crumb without appreciably reducing the moisture content of the crust and crust zone or the soft nature thereof i. e., the vacuum is so controlled that the boiling point of water therein does not fall substantially below the temperature of the crust. In this manner, the condition of the crust is maintained substantially unchanged while the moisture loss from the crumb is regulated so that only sufficient moisture is removed to properly cool the bread. As will be appreciated, by reason of the reduced temperature of the loaf when submitted to the vacuum, a lesser differential or lower drop is permitted in order to achieve the desired final temperature. Not only is the moisture content of the crust left substantially unchanged, but a reduced amount is removed from the crumb, because the number of degrees which the temperature of the bread need be reduced have been substantially decreased.

By reason of these discoveries, it is possible to employ vacuum cooling for bread and other bakery products and to recover a loaf from the vacuum treatment having a soft, moist crust and crust zone ready for slicing and packaging.

The advantages of being able to use the rapid cooling permitted by vacuum treatment are important to the modern bakery where frequent delivery of bread is often featured and, with the present almost universal sale and distribution of the bread in sliced form, the value of rapid cooling and production of a loaf which may be neatly sliced by a slicing machine is of great importance.

The invention may be carried out in connection with bread racked in the usual way or as a continuous process in association with a travelling oven, from which the loaves will be received upon a conveyor and carried through a suitable holding or tempering operation, being then transferred and carried continuously through a vacuum apparatus. In some cases, the vacuum treatment will be carried out upon intermittently moving and stopping belts, according to the most suitable conditions.

The vacuum may be produced, i. e., built up, in the presence of the bread, or the bread is introduced into a vacuum chamber already exhausted or partially exhausted.

With respect to the conditions surrounding the holding or tempering period, (1) the bread as removed from the oven may simply be permitted to remain exposed to the air; (2) the hot loaves may be treated by blowing air thereover, which hastens the tempering period; or (3) precise conditions may be maintained and the bread held or tempered in warm humid air, e. g., in a room at 90° F. with 98% relative humidity.

It will be appreciated that the holding period both as to time and the particular conditions maintained will vary with the nature of the bread, the baking temperatures employed, the constituents of the bread and the specific characteristics which it is desired that the ultimate product possess. In any case, the invention is operable by conditioning the bread preliminary to the vacuum treatment so that it has a soft relatively moist crust and crust zone and a substantially reduced temperature, with the temperature of the crust and crust zone appreciably lower than that of the crumb.

As one example of carrying out the invention, when a loaf leaves the oven, it is theoretically at a temperature at 212° F. throughout. At this time the crust is of the same temperature as the crumb, or higher, and is completely dry (vide. Dr. J. R. Katz, "Baker's Weekly", June 26, 1934).

Any moisture which may reach the crust zone from the moist crumb will promptly vaporize into the air. The crust, however, due to its contact with the air surrounding it, loses heat rapidly by radiation, and after some few minutes will be found to be considerably cooler than the crumb. The result is that due to the higher temperature and moisture content of the crumb, moisture begins to travel to the cooler crust zone. After some ten to fifteen minutes the crust has become sufficiently cool that it fails to evaporate the moisture into the air as rapidly as it is receiving it from the crumb, with the result that it commences to become moist and to soften. This is the first of the required functions which take place in the tempering period.

By the time this softening of the crust is noticeable, the crust temperature will be found to be around 130° to 135° F., while the crumb will be around 165° to 175° F. This cannot be laid down as a hard and fast relationship, as many other factors are involved, such as the type of bread, its conductivity, the nature of the crust and so on. However, the fact remains that although the entire load has cooled to a certain extent, the crust has cooled far more than has the crumb.

The tempering period may now be considered to have served its purpose for certain types of bread, and the bread may be introduced to the vacuum cooler and treated as will be later described in detail.

For other types, having a more crisp type of crust when delivered from the oven, an extension of the tempering period is desirable, to allow the following factor to control its subsequent cooling under vacuum. The aforementioned redistribution of moisture having commenced, the loaf is allowed to remain exposed to the air until the crust temperature has fallen to 115° F. or less e. g., about room temperature. The crumb will then be around 135° F. When a loaf in such condition or that just previously described is exposed to the vaporizing action of sub-atmospheric pressure, moisture will be evaporated from the crumb as soon as the vacuum reaches a point which corresponds to a vaporization temperature i. e., a boiling point of water equal to the temperature of the crumb, but no moisture will be evaporated from the cool crust zone until a considerably higher vacuum is reached corresponding to a boiling point of water lower than that at which moisture exists in the cool crust zone. That is to say, where the temperature of the crust zone before vacuum treatment is as low as desired in the final temperature of the loaf, vacuum need only be exerted to evaporate moisture from the crumb. Where this is not the case, moisture is extracted from the crumb until the temperature thereof reaches that of the crust and crust zone, whereupon the degree of vacuum is increased to reduce the temperature of the entire loaf to the desired point. In this latter case, a small amount of moisture will thus be evaporated from the crust and crust zone as well as from the crumb during this continued subjection to vacuum. However, in view of the tempering treatment, the small loss of moisture from the crust zone is substantially inappreciable in that the original soft, moist condition of the crust is not affected.

The net result of the tempering period is that it enables moisture to be extracted from one part of the load to a greater degree than it is extracted from another, when the loaf is subjected to vacuum treatment. This is precisely what is required in the preparation of bread for slicing and wrapping.

It will be appreciated then that not only does the holding period control or regulate the condition of the loaf as presented to the vacuum chamber but, moreover, permits of nice control of the vacuum whereby the desired condition of the crust is maintained and the required amount of moisture removed from the crumb.

In connection with the speed of operation of the present invention, I have found it possible to cool the bread to the desired final temperature, ready for slicing and packaging, within a time period of about fifteen to thirty minutes after its removal from the oven. This compares very favorably with present satisfactory cooling methods requiring from one and one-half to four hours.

In connection with the prevention of excessive moisture loss, as a result of the present process, this does not exceed three per cent and is usually between substantially two or three per cent. Ordinarily in bakery practice a moisture loss of 3.5 per cent is frowned upon and a loss of four per cent or more renders the article objectionable. Hence the present invention produces an article satisfactory in all respects.

I have referred herein to "bread" and the term is used in its generic sense, in that I intend to include bakery products in general wherever evaporative or vacuum cooling is resorted to.

I claim:

1. The process of cooling hot baked bread comprising subjecting the bread to a holding period to partly cool the crust, further cooling the bread by subjecting it to a vacuum, the degree of vacuum being maintained at a point above the vapor pressure of water at the crust temperature.

2. The process of cooling hot baked bread comprising subjecting the bread to a holding period to partly cool the crust, further cooling the bread by subjecting it to a vacuum, the degree of vacuum being first maintained at a point above the vapor pressure of water at the crust temperature, and then increased to a point below the vapor pressure of water at the crust temperature.

3. The process of cooling hot baked bread comprising subjecting the bread to a tempering period to partly cool the crust, further cooling the bread by subjecting it to a vacuum, the degree of vacuum being maintained at the vapor pressure of water at the crust temperature.

4. The process of cooling hot baked bread comprising subjecting the bread to a tempering period to partly cool the crust, further cooling the bread by subjecting it to a vacuum, the degree of vacuum being maintained at a point above the vapor pressure of water at the crust temperature and below the vapor pressure of water at the crumb temperature.

5. The continuous process of cooling bread comprising subjecting the bread to a holding period and thereby reducing the temperature of the loaf and the temperature of the crust below that of the crumb, and further cooling the loaf by vacuum treatment and controlling the vacuum so that the boiling point of water in such vacuum does not fall substantially below the temperature of the crust.

6. In the process of cooling bread, the step of cooling the loaf by vacuum treatment and controlling the vacuum so that the boiling point of water in such vacuum does not fall substantially below the temperature of the crust.

7. The process of cooling bread comprising subjecting the bread to a holding period and thereby reducing the temperature of the loaf and the temperature of the crust below that of the crumb, and cooling the loaf by vacuum treatment and controlling the vacuum so that the boiling point of water in such vacuum does not fall substantially below the temperature of the crust.

8. The process of cooling bread comprising subjecting freshly baked bread to a holding and cooling period so as to soften the crust by distribution of moisture from the crumb, and further cooling the loaf by vacuum treatment and controlling the vacuum so that the boiling point of water in such vacuum does not vary sufficiently from the temperature of the crust as to substantially alter the crust from its softened condition.

MONTAGUE H. DUVAL.